United States Patent [19]

Eide et al.

[11] Patent Number: 5,031,984
[45] Date of Patent: Jul. 16, 1991

[54] OPTICAL FIBER ELECTRO-OPTICAL MODULE

[75] Inventors: John E. Eide, Fincastle; Teddy W. Leonard, Troutville; Ervin H. Mueller, Blue Ridge, all of Va.

[73] Assignee: Alcatel NA, Hickory, N.C.

[21] Appl. No.: 467,798

[22] Filed: Jan. 17, 1990

[51] Int. Cl.⁵ .............................................. G02B 6/26
[52] U.S. Cl. .............................. 350/96.15; 350/96.20
[58] Field of Search ............... 350/96.15, 96.17, 96.20; 250/227.14, 227.15, 227.17, 227.24, 552; 357/17, 19, 30, 74, 80

[56] References Cited

U.S. PATENT DOCUMENTS

| | | | |
|---|---|---|---|
| 3,808,549 | 4/1974 | Maurer | 372/6 |
| 4,296,995 | 10/1981 | Bickel | 350/96.15 |
| 4,423,923 | 1/1984 | Frazier et al. | 350/96.15 |
| 4,431,260 | 2/1984 | Palmer | 350/96.15 |
| 4,465,335 | 8/1984 | Eppes | 350/96.15 X |
| 4,468,085 | 8/1984 | Papuchon et al. | 350/96.15 X |
| 4,630,255 | 12/1986 | Gouali et al. | 350/96.15 X |
| 4,637,682 | 1/1987 | Mahlein et al. | 350/96.15 |
| 4,708,423 | 11/1987 | Erman et al. | 350/96.15 |
| 4,867,520 | 9/1989 | Weidel | 350/96.15 X |
| 4,878,727 | 11/1989 | Boiarski et al. | 350/96.15 X |

*Primary Examiner*—John D. Lee
*Assistant Examiner*—Phan T. Heartney
*Attorney, Agent, or Firm*—Peter C. Van Der Sluys

[57] ABSTRACT

An electro-optical module has at least threee ports, with at least one port having an active electro-optical device for connection to electrical circuitry and at least one port having an optical port for connection to an optical fiber link. A passive coupler interfaces the various ports. The passive coupler is formed of optical fibers mounted on glass using an adhesive that exhibits refractive index-matching characteristics. The fiber-on-glass coupler is extremely small, allowing for the module to have minimal size. The coupler may be wavelength selective or wavelength insensitive. If a wavelength-selective coupler is utilized, the end surface of an optical fiber is coated with a dichroic filter to provide wavelength sensitivity. An optical fiber adapted to receive light for connection to a detector is selected to be a multi-mode fiber to increase reception of light. The remaining fibers may be single-mode fibers.

21 Claims, 5 Drawing Sheets

OPTICAL FIBER ELECTRO-OPTICAL MODULE

BACKGROUND OF THE INVENTION

1. Field of the Invention

The present invention relates to hybrid electro-optical converter modules, and more particularly, to modules adapted for use in coupling information between an optical fiber and electrical wires and vice versa.

2. Description of the Prior Art

Optical fibers are rapidly becoming the transmission means of choice for conveying information between two different locations. The advantages of using optical fiber transmission lines are well known, in that they provide significantly greater bandwidths and information-carrying capacity. In most instances, optical information being transmitted over an optical fiber, either in a single direction or bidirectionally, must undergo an electro-optical conversion at each terminal of an optical fiber link, since the information is still usually processed in its electrical form. Electro-optical converting systems have been designed for both single and bidirectional transmission of optical information, and these systems have typically been constructed using discrete components to which the optical fibers are spliced. It is well recognized that it is a demanding task to connect small optical fibers to the individual components of a converting system.

Attempts have been made to integrate these components into a single unit generally referred to as a module. The modules usually require active devices in the form of optical detectors and optical sources and a passive component in the form of an optical coupler or optical splitter, with optical fibers used within the module to connect the active elements to the passive coupler. Connecting the optical fibers to these active and passive devices was a difficult task and, in many cases, required the use of special lenses to focus the light onto the end surfaces of the fiber and the appropriate areas on the active and passive devices. The need for the lenses and, particularly, the passive coupler device, resulted in the modules being rather large and bulky, with marginal performance capability due to electrical cross-talk between the active devices and poor isolation between transmitted and received optical information.

In many instances, it is desirable to provide for the bidirectional transmission of optical information; in such cases, the optical information is transmitted at different wavelengths in each direction, necessitating the use of a wavelength selective coupler which, in many cases, was large and did not provide satisfactory wavelength separation between the transmitted and received optical information.

U.S. Pat. No. 4,844,573 issued to Gillham et al discloses several embodiments of electro-optical converters provided in module form. Most of the converters of Gillham et al included three ports: one port for connection to an optical fiber link for bidirectional transmission, one port containing an electro-optical interface in the form of an optical detector, and the third port being an electro-optical interface in the form of an optical light source. The coupler utilized in Gillham et al is a fused fiber coupler. When fused fiber couplers are used the two active components are disposed on the same side of the module, so as to be in close proximity to each other. Such an arrangement can lead to increased electrical cross-talk between the active components unless special efforts are made to separate the components or electrically isolate them. Fused fiber couplers do not have the best wavelength isolation characteristics, and the transmitted and received signals are not adequately separated.

A preferred form of coupler, where wavelength selectivity is desired, is a coupler exhibiting dichroic properties. Such a coupler utilizes a multi-layer of dielectric coatings to establish an interface that is capable of reflecting a particular wavelength of light while transmitting a second wavelength. U.S. Pat. No. 4,296,995 issued to Bickel discloses an optical fiber beam splitter coupler employing coatings with dichroic properties. The device of the Bickel patent, however, provided only a coupling mechanism and, in addition, was rather large and bulky, since the fibers from which it was constructed were encapsulated in a body of potting compound.

Thus, the prior art did not provide a small, compact electro-optical module having low cross-talk and good wavelength separation.

SUMMARY OF THE INVENTION

The present invention contemplates an electro-optical module containing at least one active electro-optical converting device and at least one passive coupler. The module has at least three ports. One port is an optical port for connection to an optical fiber link, which connection may be made through an optical fiber pigtail or an optical connector. A second port is for electrical connection to an active device. The third port can be either optical or electrical, depending upon the requirements of the system with which it is to be used. Electronic drive and sensing circuitry could also be included in the module; however, in such a case, the module will have additional electrical connection pins. In most cases, the module has two electrical ports using two electro-optical converting devices and one optical port.

The module described herein utilizes standard active devices in the form of optical detectors and optical sources capable of being optically coupled to optical fibers. A passive coupling device is utilized that may be either wavelength selective or wavelength insensitive. In the case of a coupler that is wavelength selective, the coupler functions as a wavelength multiplexer-demultiplexer and utilizes a dichroic filter to achieve wavelength selectivity. In the case of a wavelength-insensitive coupler, the coupler is merely a combiner or splitter of optical power.

Small size and good coupling are achieved through the use of a passive coupler device constructed by mounting the ends of specially prepared optical fibers on a glass substrate on which the fibers are selectively oriented to provide the desired optical coupling or splitting. The fiber-on-glass coupler is particularly advantageous due to its small size and its ability to maintain the fibers in the proper position in respect to each other over a wide range of environmental conditions.

Excellent wavelength separation and high cross-talk isolation are achieved through the use of a dichroic filter which is formed directly on an end surface of an optical fiber. The use of such a dichroic filter provides wavelength characteristics with a sharp cutoff for good wavelength separation, and also allows for the construction of a module having minimum electrical cross-talk because the active elements may be positioned at different ends of the module.

A primary objective of the present invention is to provide an electro-optical module of reduced size.

Another objective of the present invention is to provide a passive coupler constructed using a fiber-on-glass technique.

Another objective of the present invention is to provide a dichroic filter directly on the end surface of an optical fiber.

Another objective of the present invention is to provide an electro-optical module using a dichroic filter to provide improved wavelength isolation with minimal optical cross-talk.

Another objective of the present invention is to provide an electro-optical module utilizing a dichroic filter having very sharp wavelength cut-off characteristics.

Another objective of the present invention is to provide an electro-optical module which results in low electrical cross-talk by providing good physical separation between the active components while maintaining minimum size.

DETAILED DESCRIPTION OF THE PRESENT INVENTION

Figure 1:
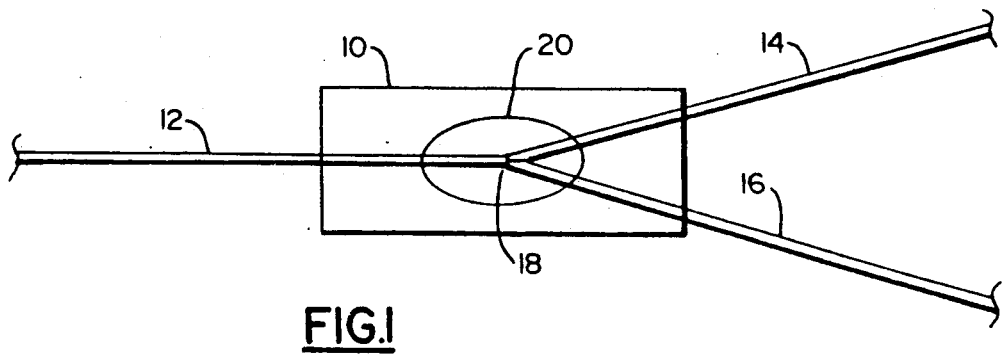
FIG. 1 is a plan view of a combiner/splitter coupler used in the present invention.
Figure 2:
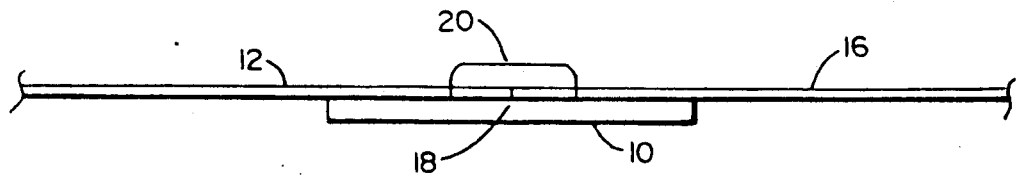
FIG. 2 is a front elevational view of the coupler of FIG. 1.
Figure 3:
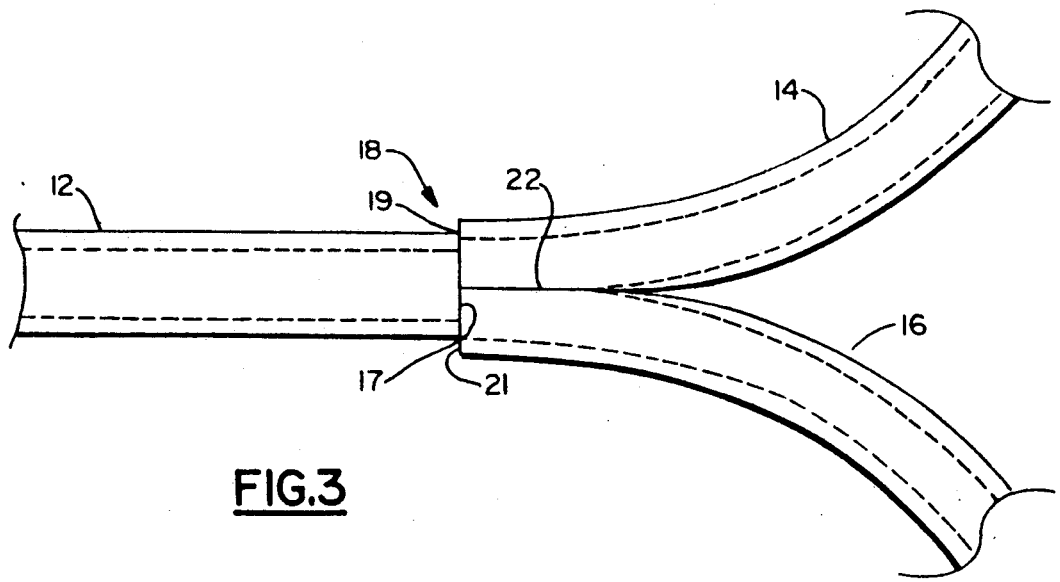
FIG. 3 is a diagrammatic illustration of the junction of the coupler shown in FIG. 1.

Referring to FIGS. 1, 2 and 3, there is shown a first type of optical fiber coupler that may be used with the present invention for a wavelength-insensitive module which may function as an optical combiner or splitter. A glass substrate 10 having a flat surface supports the fibers of the coupler, which fibers include a link fiber 12 and two branch fibers 14 and 16. The fibers are supported on the substrate and meet at a junction 18 and are held in place on the substrate through the use of an ultraviolet-curable adhesive 20. The ultraviolet-curable adhesive also has index-matching characteristics which are advantageous when coupling optical fibers. Suitable optical adhesives are available from Norland Products, Inc., New Brunswick, N.J., and Lens Bond UV74 epoxy from Summers Laboratories can also be used.

FIG. 3 shows in greater detail the junction 18 between fibers 12, 14 and 16. The fibers are each cut squarely at the ends, with end surfaces 17, 19 and 21 being polished flat. In addition, fibers 14 and 16 are polished along one side for a short length near their end surfaces 19 and 21 to remove a portion of the cladding layer so that exposed portions of the cores of fibers 14 and 16 are in juxtaposition at 22. The separation between the core and cladding layers of the fibers are indicated by dashed lines in FIG. 3. Thus, when the fibers are joined at junction 18, the cores of all three fibers are all in contact with each other.

The fibers of the coupler are aligned and mounted to the glass plate using a technique similar to an optical fiber splicing technique developed by a French company known as Alliance Technique Industrialle. The technique utilizes a silicone elastomeric mold having a surface in which precision grooves are formed corresponding to the desired positions of the optical fibers. The optical fibers are placed within the grooves on the mold and are connected to optical sources and detectors. The glass substrate 10 with the ultraviolet-curable adhesive 20 disposed on a surface is positioned over the mold to thereby sandwich the optical fibers in place. The optical fibers are then physically adjusted while monitoring the light detectors to determine when maximum light coupling is achieved. The physical adjustment of the fibers is done in two ways: rotation of the fibers for end surface alignment, and axial movement to minimize fiber spacing at the junction. When the desired alignment is attained, the adhesive is subjected to ultraviolet light through the glass substrate and is thereby cured. After the adhesive is properly cured, the mold is removed and the coupler has been formed on the glass substrate 10.

Figure 4:
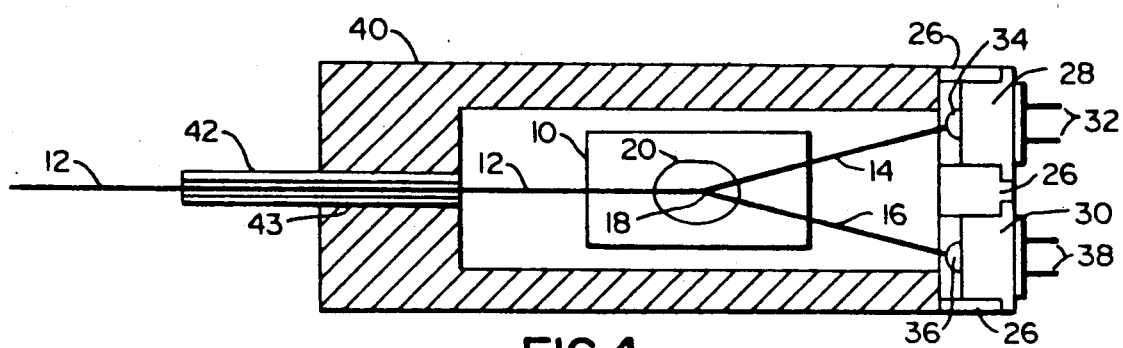
FIG. 4 is a partial horizontal sectional view of a module using the coupler of FIG. 1.
Figure 5:
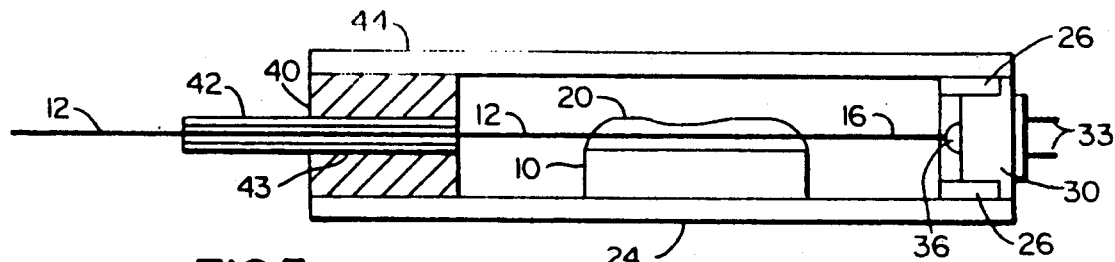
FIG. 5 is a partial vertical sectional view of the module of FIG. 4.

FIGS. 4 and 5 show an electro-optical module formed as an optical combiner/separator using the coupler shown in FIGS. 1, 2 and 3. The glass substrate 10 is mounted on a metal heat sink base 24 which at one end includes a metal wall 26 having openings therein for receiving a light source 28 and a light detector 30. The light source 28 may be any standard semiconductor laser or light-emitting diode capable of converting electrical signals to optical signals. The source 28 includes terminals 32 for connecting an electrical signal thereto. Standard optical sources include a small glass lens 34, to increase the light coupled into the optical fiber 14. Detector 30 may be any commercially-available detector component such as a PIN diode, which includes a lens element 36 for directing light from the optical fiber 16 onto the diode surface and electrical terminal 38 for providing an electrical output corresponding to a received optical input. The metal wall 26 connected to the metal base 24 functions as a heat sink for the active opto-electrical devices 28 and 30. A molded plastic housing 40 is formed about three sides of the base 24 and has at an end opposite the metal wall 26 an opening formed therein in which there is mounted a ceramic or metal ferrule 42 through which optical fiber 12 may extend. A sealant material 43 is provided within the ceramic ferrule 42 to seal the fiber to the ferrule and provide a seal for the interior of the module. A metal or plastic cover 44 is mounted over the body 40 and the end wall 26 to totally encapsulate and seal the interior of the module.

Thus, the module shown in FIGS. 4 an 5 can function as an optical combiner or splitter and may be provided in a smaller size than was heretofore available.

Figure 6:
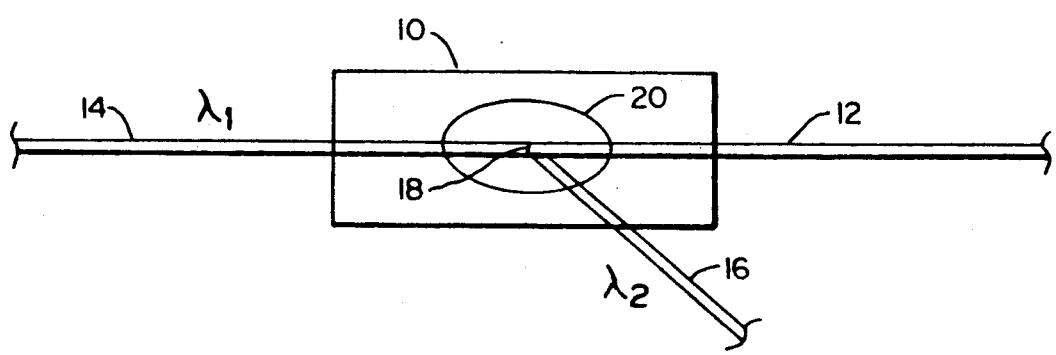
FIG. 6 is a plan view of a wavelength selective coupler used in the present invention.
Figure 7:
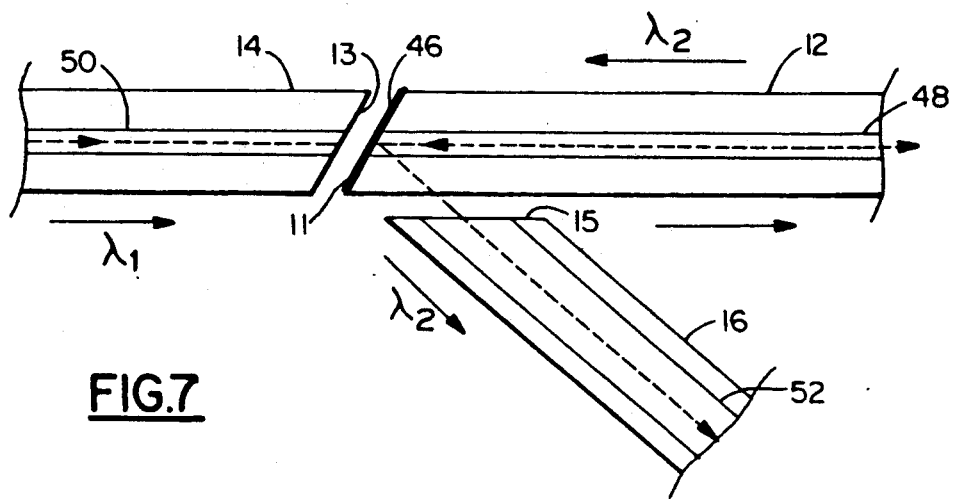
FIG. 7 schematically shows in detail a first embodiment of the coupler of FIG. 6.

Referring to FIG. 6, there is shown a plan view of a wavelength-selective coupler which is constructed in a manner similar to that of the coupler shown in FIG. 1, with the exception of the particular orientation of the optical fibers and the junction 18. Referring to FIG. 7, there is shown in greater detail the particular orientation of the optical fibers of one form of the coupler of FIG. 6. Fiber 12 functions as the fiber for the optical link and carries optical signals bidirectionally. The optical signals are of different wavelengths, as indicated by λ1 and λ2. Optical fiber 16 is connected to an optical detector for receiving optical signals having a wavelength of λ2 from optical fiber 12, while optical fiber 14 is connected to a source for providing an optical signal to optical fiber 12, said optical signal having a wavelength of λ1. Fibers 12 and 14 are cut at an angle forming end surfaces 11 and 13, which are polished. The end surface 11 of fiber 12 has a dichroic filter 46 formed thereon. Fiber 16 has its end cut at an angle forming end surface 15, which is also polished and is positioned adjacent to fiber 12 for receiving light reflected by the dichroic filter 46.

The absolute value of the angles at which the ends of the fibers 12, 14 and 16 is not critical. However, the angles of the ends of fibers 12 and 14 need to be the same, and the angle of end surface 15 of fiber 16 is such that fiber 16 will receive the light reflected from the dichroic filter 46. The angle of fiber 16 must be adjusted to compensate for the change in optical path caused by the refractive index variation as the optical wave λ2 exits fiber core 48 of fiber 12 and passes through its cladding before entering fiber 16. An angle of approximately 40° between axis of the fibers 12 and 16 was selected. This results in a value for the angle of the ends of fibers 14 and 12 to be between 18° and 20°, depending on the index profile of fiber 12.

The alignment of fibers 14 and 12 is achieved by observing the ends of the two fibers in a microscope and aligning the fibers such that the two surfaces are parallel. Fiber 16 is actively aligned by monitoring and maximizing the optical power detected on fiber 16 when infecting on fiber 12.

Dichroic filter 46 is formed using known techniques by depositing a plurality of layers of dielectric material to form the dichroic filter. The dichroic filter is similar to that disclosed in the aforementioned Bickel patent, with the material of the dielectric layers being selected so that the filter reflects light having a wavelength of λ2 and transmits light having a wavelength of λ1.

The coupler shown in FIG. 7 can be formed using multi-mode fibers, in which case the active source and detector devices could be connected to either fiber 14 or 16. In the event that it is desirable to use a single-mode fiber for the optical transmission link, fiber 12 would be a single-mode fiber, as indicated in FIG. 7, which shows fiber 12 having a small diameter core 48. It is, however, always preferable for the fiber connected to the detector to be a multi-mode fiber, as indicated in FIG. 7, where fiber 16 has a large diameter core 52 for connection to a detector while fiber 14 is single mode and is connected to an optical source. By using a multi-mode fiber for the detector fiber link, the reflected light from dichroic filter 46 is more easily captured by the fiber 16.

Figure 8:
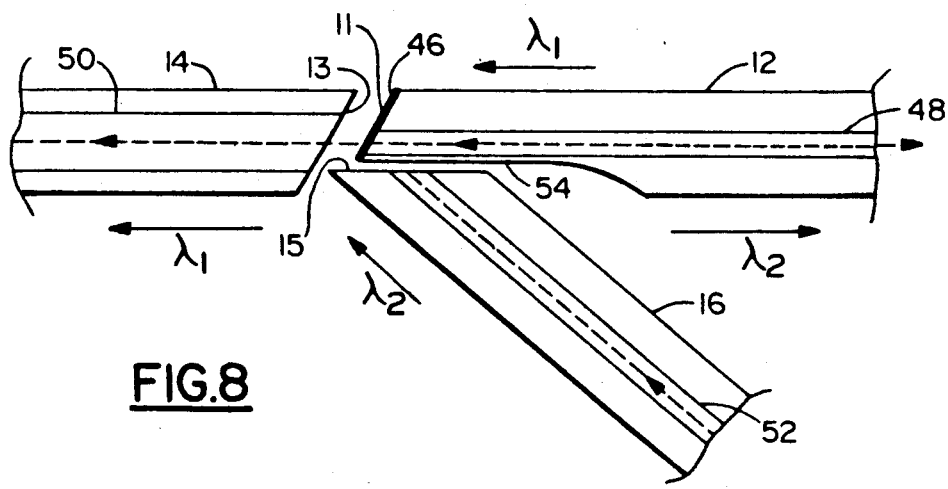
FIG. 8 shows schematically the details of another embodiment of the coupler of FIG. 6.

Referring to FIG. 8, there is shown another embodiment of a wavelength-selective coupler wherein the dichroic filter is adapted to pass the received wavelength λ1 and to reflect the transmitted wavelength λ2. In such a case, fiber 12 is again a single-mode fiber forming the optical transmission link, while fiber 14 is a multi-mode fiber having a large core 50 for receiving light of wavelength λ1 passed by the dichroic filter. Fiber 14, the multi-mode fiber, is connected to a detector. Fiber 16 is a single-mode fiber having a small diameter core 52 and being connected to a light source for providing light having a wavelength of λ2. In this embodiment, a portion of the cladding material of fiber 12 is removed in the region 54 so as to allow the light emanating from fiber 16 to more easily reach the dichroic filter 46 and be reflected therefrom.

In FIGS. 7 and 8 the ends of the fibers are shown with considerable spacing from each other. This is for illustrative purposes only. The fiber ends should be as close together as possible.

Figure 9:
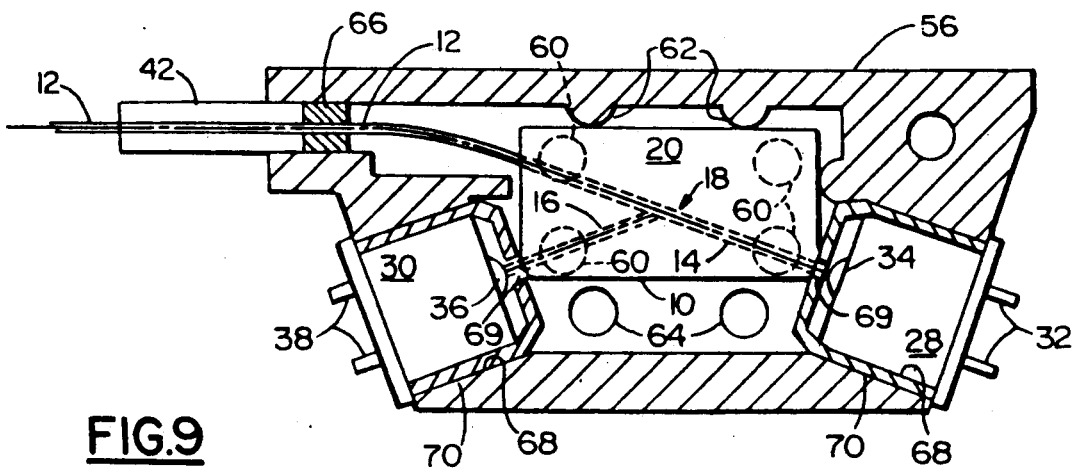
FIG. 9 is a partial horizontal sectional view of a module using a coupler as shown in FIG. 6.
Figure 10:
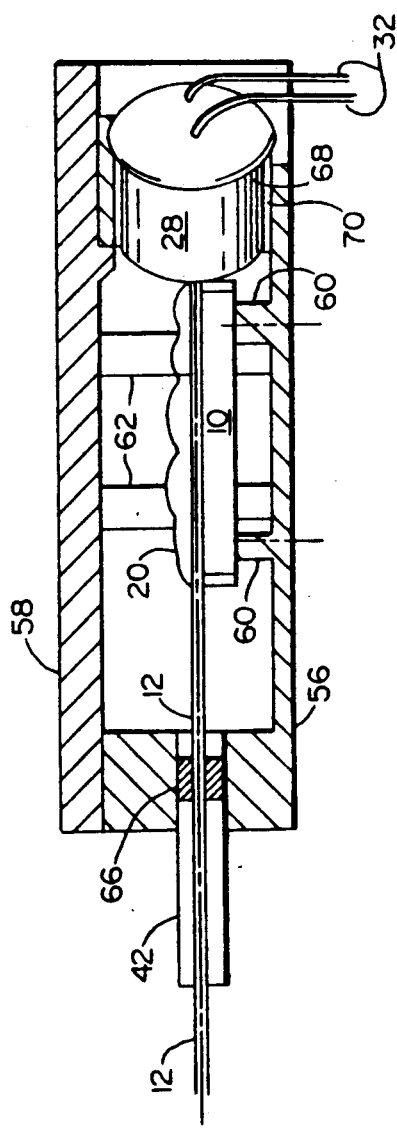
FIG. 10 is a partial vertical sectional view showing the module of FIG. 9.

Referring to FIGS. 9 and 10, there is shown an electro-optical module constructed using an optical coupler as shown in FIGS. 7 and 8. The module is primarily adapted for use with couplers formed using all multi-mode fibers and includes a molded plastic housing 56 having a plastic cover 58 sealed thereto. Mounted on posts 60 within the molded plastic housing 56 is the glass substrate 10 on which the coupler is mounted, including the optical fibers 12, 14 and 16.

The molded plastic housing includes a plurality of ribs 62 extending into the interior of the housing and two upwardly extending posts 64 which engage the glass substrate 10 for positioning the substrate within the module. A ceramic or metal ferrule 42 is mounted within the molded plastic housing to receive fiber link 12 which extends therethrough and terminates in the form of either a pigtail fiber or an optical fiber connector. A seal 66 is provided within the ferrule 42 for sealing the inner surface of the ferrule to the fiber. The seal is made of a potting compound, that is, a composite material which exhibits a stable temperature characteristic in that the thermal coefficient of expansion is compatible with that of the ceramic ferrule 42. The molded plastic housing 56 includes two ports 68 which are lined with metal inserts 70 which function as heat sinks for active devices 28 and 30 which are mounted therein. Device 28 is an optical source similar to that described in relation to FIG. 2 and includes a lens 34 and terminals 32. Optical fiber 14 is optically aligned to lens 34 to make an optical connection to the source device 28. Active device 30 is an optical detector including a lens 36 and terminals 38. Optical fiber 16 is optically aligned to lens 36 to make an optical connection to the detector device. These two optical fiber connections are made through small holes 69 in the metal inserts 70. The fibers are first set in place with the ends through the holes 69 and are then fixed with epoxy. The active devices are placed in the inserts 70 and are aligned to the fibers by optically monitoring to determine the optimum position. After reaching optimum position and active devices are fixed using epoxy between the metal insert 70 and active devices 30 and 28.

The angle subtended between fibers 16 and 12 in the coupler is dependent upon the angle at which the fiber ends are cut in the coupling device. The angles are selected so that the fibers within the coupler may be disposed in straight lines while providing maximum distance between the active devices 28 and 30 to prevent electrical coupling therebetween. Also, the angles are selected so that only a large radius bend would be required in fiber 12, while still keeping the module size to a minimum. Ferrule 42 could have been mounted in the module to be coaxial with fibers 12 and 14 in the coupler; however, this would require a larger-sized module and therefore optionally a large radius bend was used in fiber 12 to keep the module at a minimum size.

Figure 11:
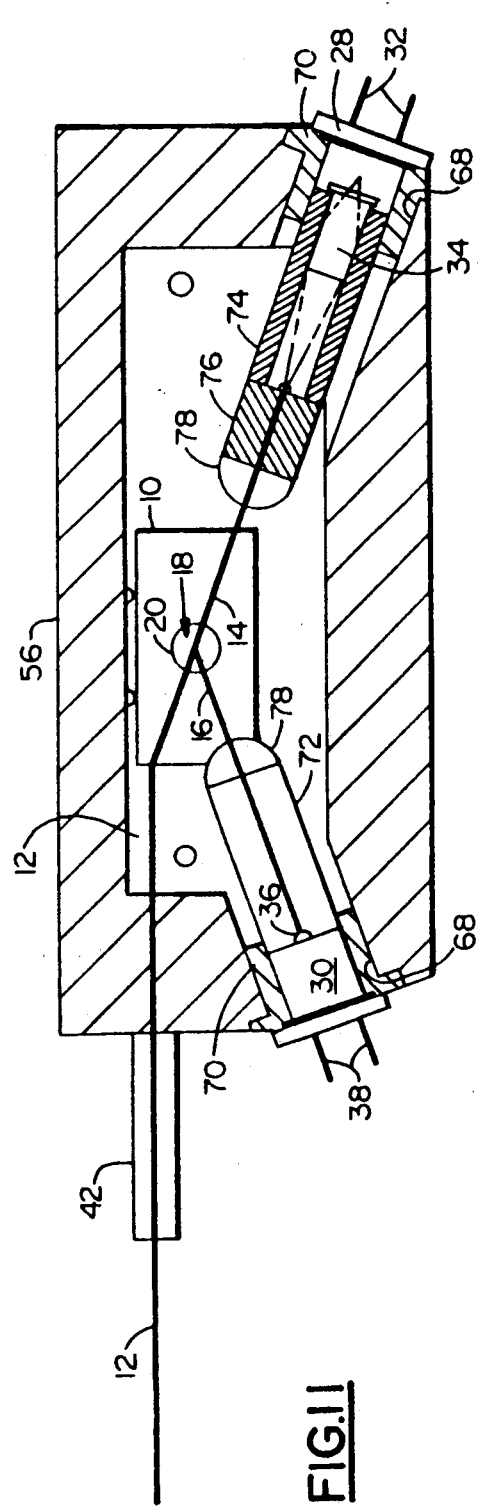
FIG. 11 is a partial horizontal sectional view of a module using a coupler as shown in FIG. 7.
Figure 12:
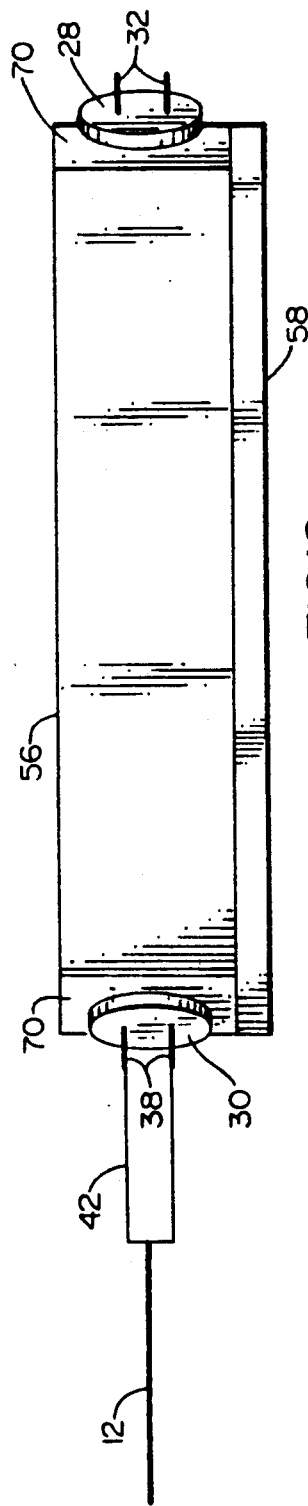
FIG. 12 is a front elevational view of the module of FIG. 11.

Referring to FIGS. 11 and 12 there is shown another embodiment of an electro-optical module wherein the coupler is formed using single-mode fibers for the transmission link 12 and for fiber 14 going to an optical source, and a multi-mode fiber 16 for connection to a detector. Because of the use of single-mode fibers 12 and 14 and a multi-mode fiber 16, the source and detector structures are somewhat different in this embodiment. The multi-mode fiber 16 is directed through an epoxy-filled capillary tube 72 to the optimum coupling position near lens 36 on detector 30. The source 28 is assembled in a standard compact disk (CD) type package. It can consist of a light-emitting diode or a laser. In case of a laser, a rear facet detector is normally included in order to control the laser. The source 28 is connected to a different type of structure, since it must focus its light onto the thin core of a single-mode fiber 14. A coupling structure includes a graded index or SELFOC lens 34 for focusing light from the source 28 onto the end of fiber 14. Lens 34 is mounted in a ceramic sleeve 74 which is soldered or laser welded to the housing of source 28 and to metal insert 70. A ceramic ferrule 76 accurately positions fiber 14 and is soldered to sleeve 74. An inert elastomer material 78 is disposed at the end of the ceramic ferrule 76 for holding the fiber in place. In like manner, inert elastomer material 78 is also used at the end of the capillary tube 72.

The single-mode fiber module shown in FIGS. 11 and 12 has advantages similar to those of the module of FIGS. 9 and 10, with the additional benefits of being usable with single-mode fibers for greater optical transmission distance.

Figure 13:
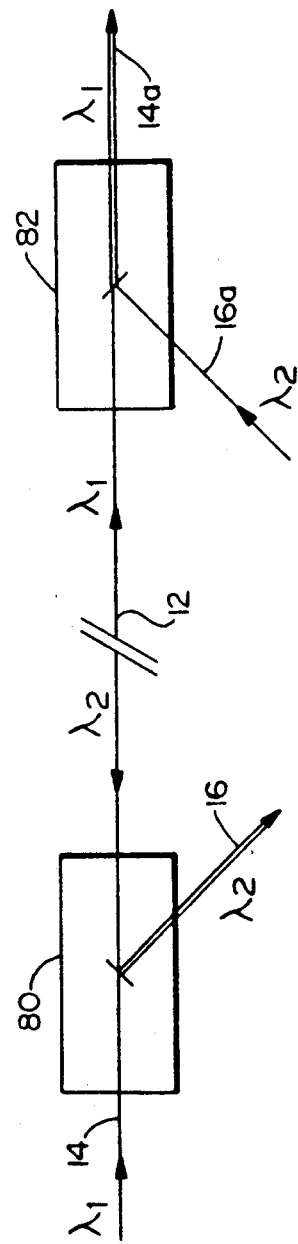
FIG. 13 is a schematic diagram of a single-mode optical fiber communications link.

Referring to FIG. 13 there is shown a schematic of an optical fiber transmission link using a single-mode fiber 12 for transmitting light having a wavelength $\lambda_1 = 1500$ nm in one direction and light of wavelength $\lambda_2 = 1300$ nm in another direction. The fiber 12 is terminated in two modules having wavelength-selective couplers 80 and 82. The coupler 80 is similar to that shown in FIG. 7, in that it receives light having a wavelength $\lambda_1$ from an optical source on fiber 14 and directs received light having a wavelength of $\lambda_2$ to a detector on multi-mode optical fiber 16. Optical coupler 82 is similar to that shown in FIG. 8, receiving light of wavelength $\lambda_1$ from optical fiber 12, with said light being passed directly to a multi-mode optical fiber 14 a to a detector which receives light of wavelength $\lambda_1$. Optical fiber 16 a of coupler 82 receives light having a wavelength $\lambda_2$ from an optical source, which light is reflected and transmitted on optical fiber 12 to coupler 80.

The above embodiments have been described using an optical coupler formed using a fiber-on-glass technique. It is contemplated that the coupler could also be formed using optical waveguides diffused into a glass substrate, a technique that is rapidly becoming accepted. The waveguides 12, 14 and 16 would be diffused into the substrate having the same orientation as the optical fibers, and thereafter a portion of the glass substrate at the junction would be sawed out of the glass at an appropriate angle to waveguides 12 and 14. A glass insert would be replaced into the sawed-out portion, with the dichroic filter being deposited on one surface of the glass insert. The optical fiber for the transmission link would be connected to the coupler by forming a V-groove in the glass substrate in alignment with the diffused waveguide, and the optical fiber would be placed in the V-groove and secured thereto. The active elements 28 and 30 would include flush-mounted lenses and would be mounted directly to edges of the glass substrate in alignment with the diffused waveguides. The entire assembly could then be mounted in a housing in a manner similar to that of the other described embodiments.

Thus, the present invention provides an electro-optical module of very small size, which also has the advantages of providing good electrical and optical isolation. The module size is small by uniquely using a fiber-on-glass technique for forming the coupler. Excellent electrical cross-talk isolation is provided by being able to space the active source and detector devices a maximum distance apart while still maintaining a small module. This spacing is made possible through the use of a dichroic filter so that the transmitted and received light may be directed essentially in the opposite directions by the dichroic filter which passes one wavelength and reflects the other wavelength. Good optical isolation is also provided through the use of the dichroic filter, which provides a sharp wavelength cutoff. The dichroic filter is formed directly on a fiber end surface, which allows for a minimum coupler size, thereby allowing the module itself to be of minimal overall size. The fiber lengths within the module are kept to a minimum length and extend directly from the coupler to the source and detector without splicing or bending of the fibers.

The use of a dichroic filter allows for a wavelength isolation that is typically better than $-50$ dB. The wavelength separation provided by the dichroic filter cutoff can be made extremely narrow, usually less than 20 nm.

Thus, the present invention provides an electro-optical module having advantages and features not heretofore provided.

What is claimed is:

1. An electro-optical converter module for use in an optical fiber information transmission link, comprising:
    a support housing having at least three ports;
    a fiber-on-glass wavelength selective optical coupler secured to said support housing, said coupler comprising three optical fibers each having first and second ends, said first ends meeting at a junction for the transfer of light therebetween; and
    an electro-optical conversion device secured to said support housing at one of said ports, said device having at least one optical port and at least one electrical terminal, a second end of one of said fibers from said optical coupler being optically coupled to said optical port, and the second end of each of the other two optical fibers of the optical coupler being directed to the other two ports of said support housing.

2. An electro-optical converter module as described in claim 1, wherein the optical coupler comprises a glass substrate supporting said fibers and adhesive holding the fibers in position at the junction point.

3. An electro-optical converter module as described in claim 2, wherein the adhesive has index of refraction matching characteristics.

4. An electro-optical converter module as described in claim 1, additionally comprising a second electro-optical conversion device secured to said support housing at another of said ports, said second device having at least one optical port and at least one electrical terminal, with the second end of one of said two other optical fibers being optically coupled to the optical port for optical communication therewith, whereby the third optical fiber provided to the third port is available for connection to the optical fiber transmission link.

5. An electro-optical converter module as described in claim 4, wherein one of said electro-optical conversion devices is a light source and the other of said electro-optical conversion devices is a light detector.

6. An electro-optical converter module as described in claim 1, wherein the optical fibers have core and cladding portions extending concentrically along axes of the fibers, the first ends of the optical fibers are formed with a surface perpendicular to the axes of the optical fibers, and two of said fibers each have a part of the cladding portions removed adjacent to the first ends to provide exposed core portions, said fibers being positioned so that the exposed core portions of the fibers are in juxtaposition and the ends of the fibers having the core portions in juxtaposition are abutted against the end of the third fiber.

7. An electro-optical converter module as described in claim 1, wherein the support housing includes a metal insert located at the port in which the electro-optical device is secured, said metal insert functioning as a heat sink.

8. An electro-optical converter module as described in claim 7, wherein the support housing includes a base and side walls and additionally comprises a cover to enclose said coupler, said support housing comprising metal parts in contact with the metal insert for providing greater heat sink capacity.

9. An electro-optical converter module as described in claim 1, wherein said port or ports having optical fibers directed thereto each include a ferrule, mounted to said housing, through which an optical fiber extends, said ferrule including means for providing a seal between the optical fiber and an inner surface of said ferrule.

10. An electro-optical converter module as described in claim 1, wherein the optical fibers extend from said junction along substantially straight lines to said ports.

11. An electro-optical converter module as described in claim 1, wherein said optical coupler includes a dichroic filter disposed between at least two of said optical fibers at the junction for passing light of a first wavelength between two of said fibers and reflecting light of a second wavelength from one fiber to another fiber.

12. An electro-optical converter module as described in claim 11, wherein two of said fibers are in alignment, the first ends of said two fibers are cut at substantially identical angles to the axes of the fibers with the dichroic filter being disposed therebetween, said third fiber having the first end cut at an angle so that the end surface is substantially parallel to the axes of the first and second fibers, and the third fiber having an axis oriented relative to the dichroic filter so that light from one of said first or second fibers will be reflected off the dichroic filter along the axis of the third fiber and light from the third fiber will be reflected along the axis of one of said first or second fibers.

13. An electro-optical converter module as described in claim 12, additionally comprising a second electro-optical conversion device secured to a second of said ports, said second device having at least one optical port and at least one electrical terminal, a second of said optical fibers being optically coupled to the optical port of the second device.

14. An electro-optical converter module as described in claim 13, wherein one of said electro-optical conversion devices is a light source and the other of said electro-optical conversion devices is a light detector, and the third optical fiber being provided to a port for connection to the optical transmission line.

15. An electro-optical converter module as described in claim 14, wherein the optical fiber for connection to the optical transmission line comprises a single-mode optical fiber, the optical fiber connected to the optical source is a single-mode optical fiber, and the optical fiber connected to the optical detector is a multi-mode optical fiber, whereby the multi-mode optical fiber collects more light from the junction for the optical detector.

16. An electro-optical converter module as described in claim 14, wherein one of the two aligned optical fibers is the fiber adapted to be connected to the optical transmission line, and the third fiber is oriented to extend in a direction away from the dichroic filter and in the general direction of the optical fiber provided to the optical transmission line, whereby the two electro-optical conversion devices are disposed at opposite ends of the module to provide minimal electrical cross-talk.

17. An optical fiber as described in claim 14, wherein the dichroic filter is formed on the end surface of the fiber connected to the optical transmission line.

18. An electro-optical converter module as described in claim 12, wherein the fibers have core and cladding portions, a portion of the cladding material adjacent the end of one of the aligned fibers being removed and polished, and the end of the third optical fiber is positioned adjacent the polished surface of the optical fiber.

19. An electro-optical converter module as described in claim 15, wherein the optical detector device has a capillary tube attached thereto for receiving the multi-mode optical fiber from said junction, said capillary tube guiding and supporting said optical fiber from said coupler to said optical detector; and said light source having a ceramic sleeve attached thereto and a graded index lens disposed within said ceramic sleeve for focusing light from said light source onto the second end of a single-mode optical fiber, said single-mode optical fiber being disposed in a ceramic ferrule which is located at the end of the ceramic sleeve and attached thereto for maintaining the second end of the optical fiber in the proper position for receiving light from the optical source.

20. An electro-optical converter module for use in an optical fiber information transmission link, comprising:

a support housing having at least three ports;

a wavelength selective optical coupler secured to said support housing, said coupler comprising three optical waveguides each having first and second ends, said first ends meeting at a junction for the transfer of light therebetween; and an electro-optical conversion device secured to said support housing at one of said ports, said device having at least one optical port and at least one electrical terminal, a second end of one of said waveguides from said optical coupler being optically coupled to said optical port, and the second end of each of the other two optical waveguides of the optical coupler being directed to the other two ports of said support housing.

21. An electro-optical converter module as described in claim 20, wherein the waveguides are diffused into a glass substrate.

* * * * *